June 24, 1930.  B. RADTKE  1,767,186
WEIGHING SCALE
Filed March 15, 1926  4 Sheets-Sheet 1

Inventor:
Bruno Radtke,
By Dyrenforth, Lee, Chritton & Wiles,
Attys.

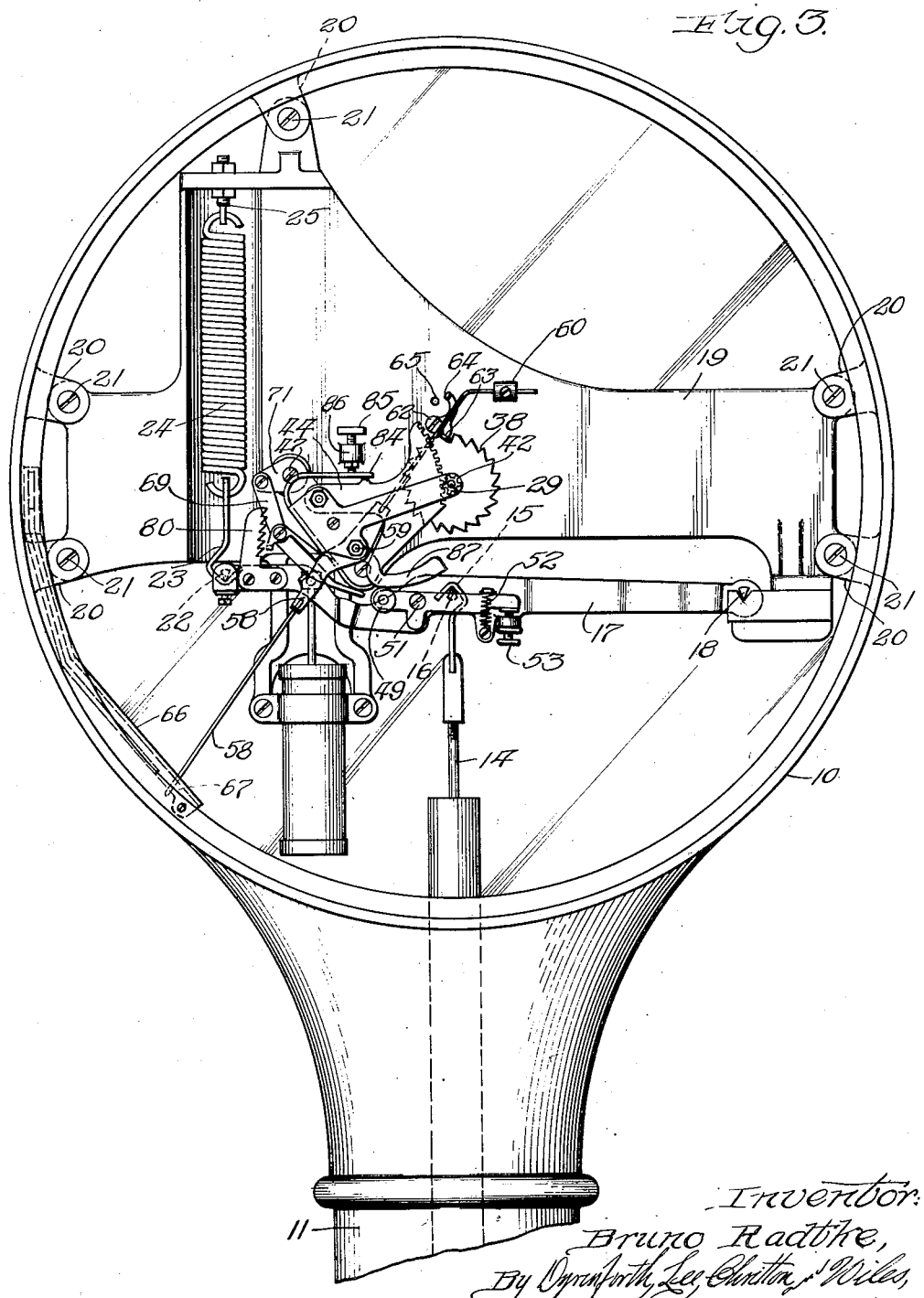

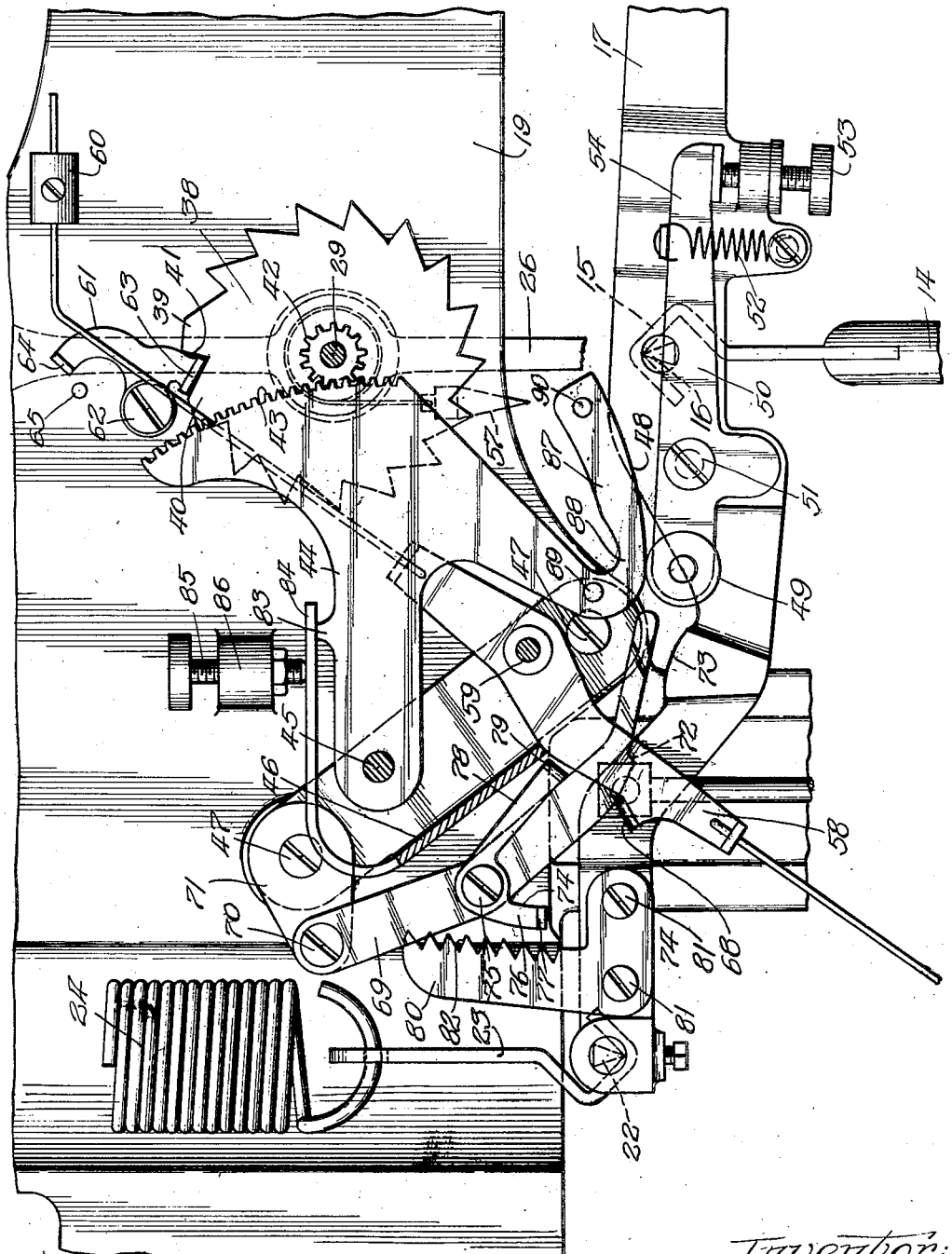

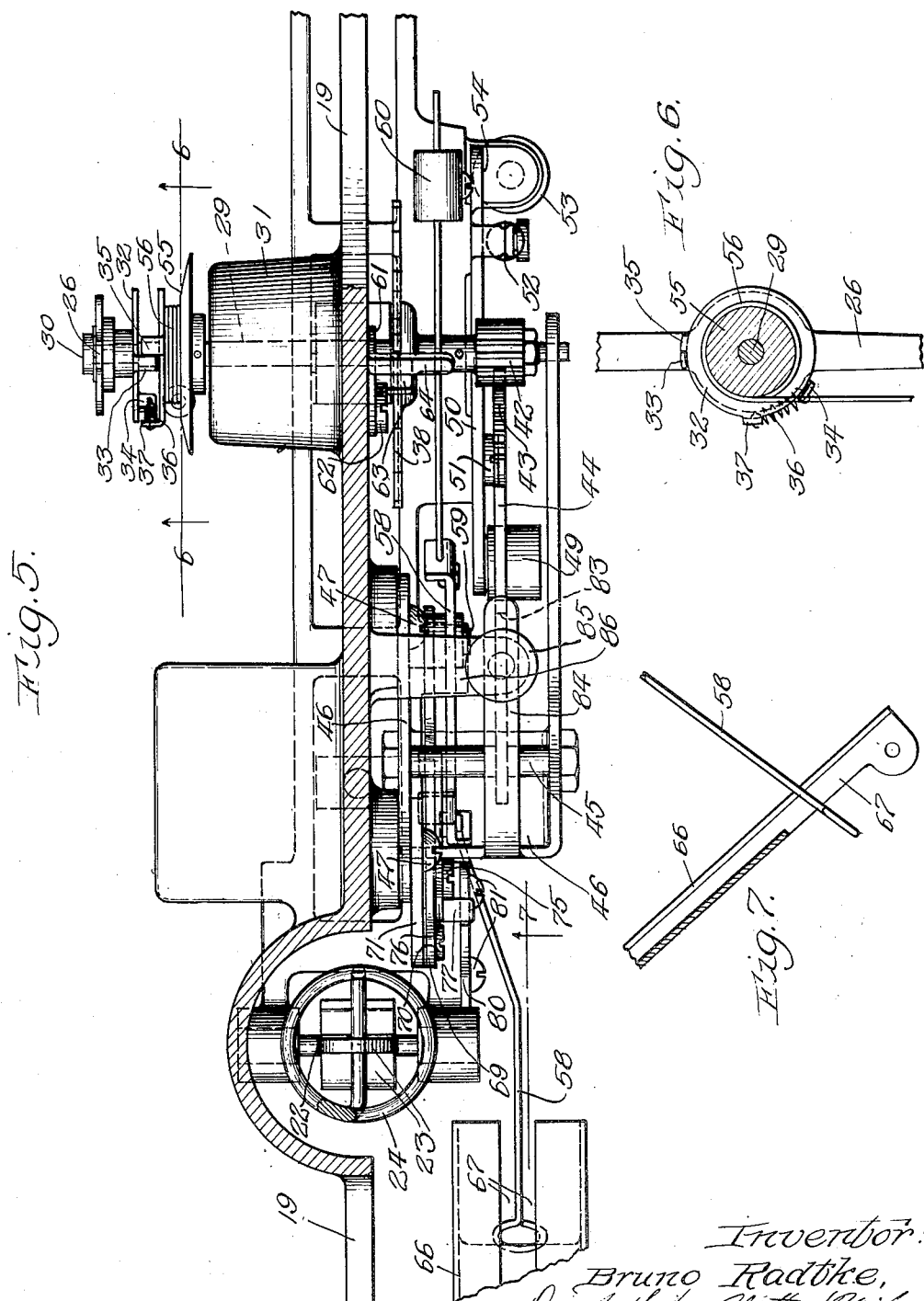

Patented June 24, 1930

1,767,186

UNITED STATES PATENT OFFICE

BRUNO RADTKE, OF LIBERTYVILLE, ILLINOIS, ASSIGNOR TO MILLS NOVELTY COMPANY, A CORPORATION OF ILLINOIS

WEIGHING SCALE

Application filed March 15, 1926. Serial No. 94,747.

My invention relates to improvements in weighing scales, more particularly of the type comprising a dial with a weighing scale thereon in circular form for cooperation with a pointer actuated through the medium of mechanism operated by the application of the weight of an object applied to the scale-platform and more particularly to machines of this type in which the mechanism above referred to is controlled by a locking mechanism which normally prevents weighing, but which is moved out of such position, upon the insertion into the machine of a proper coin, or other token.

My primary objects are to provide a novel, relatively simple, and positively operating weighing mechanism of the general character above stated, which shall present the minimum friction of the operating parts and operate to indicate accurately the weight of the object placed on the scale; to provide novel, simple pivoting operating coin-controlled weighing mechanism; to provide in a coin-controlled mechanism, against the releasing of the weighing mechanism to indicate the separate weight of two objects for one coin insertion; and other objects as will be manifest from the following description.

Referring to the accompanying drawings:—

Figure 1:
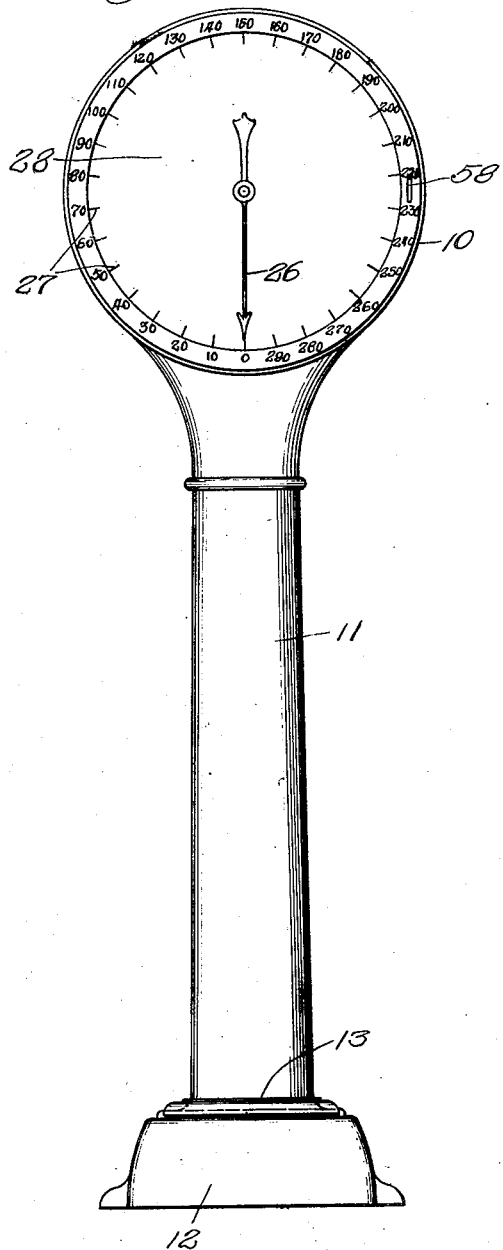
Figure 2:
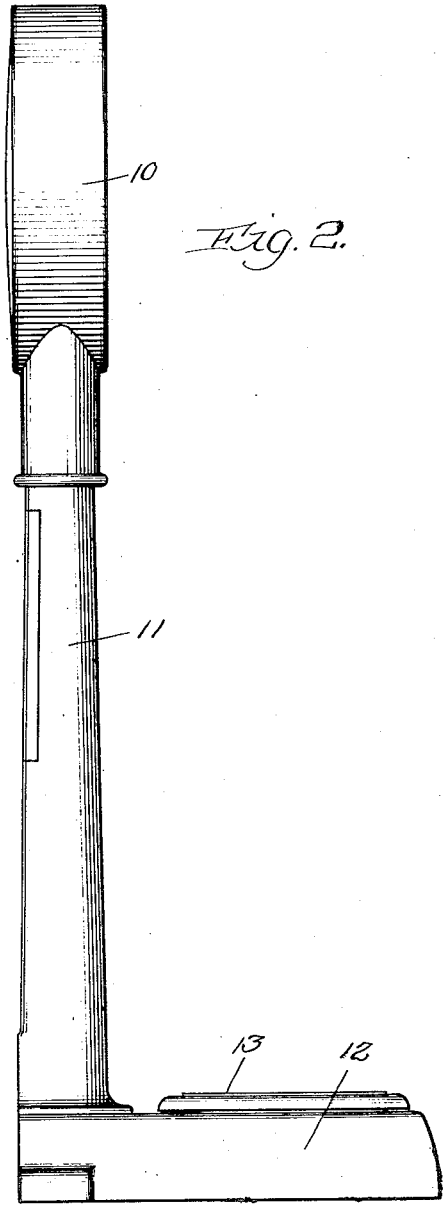

Figure 1 is a face view of a weighing scale embodying my improvements. Figure 2 is a side view thereof. Figure 3 is a view in rear elevation of that portion of the weighing mechanism which is located within the upper portion of the casing and the coin-released locking mechanism therefor, the parts being shown in the normal position of the machine, with no weight imposed on the scale platform. Figure 4 is a similar, enlarged, view of a portion of the mechanism shown in Fig. 3, with certain parts sectioned to more clearly illustrate the details of the construction. Figure 5 is a plan sectional view of the mechanism of Fig. 4. Figure 6 is a section taken at the line 6—6 on Fig. 5 and viewed in the direction of the arrows; and Figure 7 a broken sectional view of the lower end of the coin chute showing the coin-actuated cam therein.

Inasmuch as the invention to which this application relates has to do with that portion only of the mechanism of a spring scale which is located in the dial-equipped casing thereof usually provide on the upper end of a hollow standard, I have eliminated from the showing in the drawings, all of the mechanism below the said casing and which mechanism may be of common construction. In the scale shown, the upper dial-equipped casing referred to, is represented at 10 and is mounted on the upper end of a hollow standard 11 rising from a hollow base 12 at which latter the weighing platform represented at 13, is mounted. In accordance with common practice this platform, which is supported to be lowered by the weight of an object to be weighed, imposed thereon, is connected, through suitable motion-transmitting mechanism (not shown) and located in the base 12 and standard 11, with a vertically movable rod 14 extending upwardly into the casing 10, this rod, in accordance with common practice, being caused, upon placing the object on the platform 13, to lower to an extent commensurate with the weight of such object and by lowering control the mechanism by which the pointer (hereinafter referred to) is caused to indicate the weight of the object imposed upon the scale-platform.

The bar 14 is provided at its upper end with a bearing 15 which straddles a knife-edge bearing 16 carried by a beam 17 supported at one end on knife-edge bearings 18 on a bracket-plate 19 located within the casing portion 10 and secured to inwardly-extending lugs 20 thereon by screws, as indicated at 21, the opposite end of this beam being provided with a knife-edge bearing 22 engaged, and straddled, by a bearing 23 depending from, and connected with, the lower end of a coil spring 24 secured at its upper end to a stud 25 threaded in the stationary bracket plate 19 to permit of adjustment, the spring 24 serving to yieldingly support the bar 14 through the beam 17, the bar 14 moving downwardly under the weight applied to the weighing platform of the scale.

The pointer of the scale is represented at 100

26 and cooperates with a scale 27 provided on a scale dial 28, and presenting graduations in pounds. The pointer 26 is rotatably mounted on the outer end of a shaft 29 to the rear of a head 30 thereon, the shaft 29 being journaled in a boss 31 provided on, and extending forward of, the plate 19. The pointer is formed with a disk-like portion 32 having rearwardly turned lugs 33 and 34 spaced apart, the lug 33 cooperating with a forwardly bent lug on a disk 35 rigid with the shaft 29 and a light coiled spring 36 connecting the lug 34 with a forwardly bent lug 37 on the disk 35, this spring tending to maintain the lugs 33 and 35 in engagement at all times.

Rigidly secured to the shaft 29 and extending to the rear side of the plate 19 is a ratchet wheel 38 all of the teeth of which are shown as pointed except two adjacent teeth represented at 39 and 40, the peripheries of these two last-referred-to teeth being of arc shape as represented, and providing therebetween the notch 41 for interlocking with the coin-controlled locking device hereinafter referred to. The shaft 29 also has rigid therewith, to the rear of the ratchet 38, a pinion 42 which meshes with the teeth 43 of a segmental rack device represented generally at 44, this rack device being pivotally supported at one end on a stud 45 carried by a bracket 46 rigidly secured to the rear side of the plate 19 as by the screws 47, the pivoting of this rack being such, as shown, that it tends to swing, from the normal position shown in the drawings, in clockwise direction. The lower edge of the plate 44 is curved as represented at 48, at which surface it cooperates with a roller 49 journaled on the beam 17, this roller being shown as connected with the beam; through the medium of a rocking lever 50 journaled at 51 on the beam 17 and adjustable on the latter, against the action of a coil spring 52 connected at its lower end with the beam and at its upper end with the lever 50, by means of an adjusting screw 53 carried by the beam 17 and bearing against the end 54 of the lever 50.

The shaft 29 has secured to it, in front of the plate 19, a pulley 55 upon which a cord 56 is wound. One end of this cord is rigidly connected with the pulley 55 and its other end is provided with a weight 57 which exerts a force tending to rotate the shaft 29 in counter-clockwise direction in Fig. 4, namely, in the same direction in which the rack-lever 44 tends to rotate this shaft.

It will be understood from the foregoing description that the position occupied by the pointer 26 relative to the scale 27, it being in zero position when the parts are in the normal position shown in the drawings, is dependent upon the position occupied by the beam 17, the segmental rack 44 swinging downwardly, when the locking mechanism hereinafter described, is released, a distance commensurate with the lowering of the beam 17 under the weight of an object placed on the platform, the various parts of the structure being so designed, as shown, that the lowering movement of the segmental rack 44, and consequently the rotation of the shaft 29, will be commensurate with the actual weight of the object placed upon the weighing platform.

The locking means for the shaft 29 hereinbefore referred to and adapted to be released through the medium of a coin deposited into the machine, to permit the shaft 29 to rotate and indicate by its pointer 26, the weight of an object placed on the scale platform, comprises a coin-actuated lever 58 pivoted between its ends, as represented at 59, on the bracket 46. The upper end of this lever, shown as counterweighed at 60, cooperating with a locking pawl 61 pivoted at 62 on the plate 19, this pawl being provided at its lower end with a lug 63 adapted to engage with the teeth of the ratchet 38 and at its upper end with a lug 64 extending into the path of movement of the upper end of the lever 58. The pawl 61 is so pivoted that it normally engages at its lug 63 with the teeth of the ratchet 38 and is movable out of engagement with these teeth when the lever 58 is rotated in counter-clockwise direction in Figs. 3 and 4, a stop 65 being provided on the plate 19 for limiting the movement of the pawl 61 in counter-clockwise direction. The lower end of the lever 58 extends into a coin-chute 66 located within the casing 10 and opening through the front side of the latter, as shown, to receive the coins for controlling the weighing mechanism, a coin upon being dropped into the chute 66 striking the lower end of the lever 58 and rocking the latter in counter-clockwise direction to a position in which the pawl 61 extends out of engagement with the teeth of the ratchet 38 thereby releasing the shaft 29 for movement responsive to the weight of the gear segment 44 and the weight-body 57, the coin discharging through the slot 67 at the bottom portion of the chute 66 after moving the lever 58 to the position stated.

The coin lever 58 carries below the pivot 59 a rearwardly-extending lip 68 provided for cooperation with a gravity-actuated lever 69 of bent shape as shown, pivotally supported at its upper end, as indicated at 70, on a plate 71 rigidly secured to the bracket 46, the lever 69 extending in intersecting relation to the lever 58 and above the lug 68 thereon, with its lower edge shouldered as represented at 72, this shoulder being so positioned that when the coin lever 58 is rocked by the action of a coin to a position in which the pawl 61, through the engagement of this lever with the part 64, is disengaged from the ratchet 38, the shoulder 72 will extend, under the "gravity movement" of the lever 69, in front of the lug 68, and hold the coin lever 58 out of a position in which the pawl 61 engages the ratchet 38.

As shown, the lower end of the lever 69 extends directly above a boss 73 on the beam 17, and the parts are so constructed and arranged that when the lever 69, after the depression of the beam 17, is in a position in which it locks the coin lever 58 in the released position stated, the lower end of the lever 69 extends into the path of upward movement of the boss 73 in the ascent of the beam 17 to normal position when the object being weighed is moved from the platform, and thus the coin lever is released, to permit it to occupy a position in which the pawl 61 engages the teeth of the ratchet 38, in the movement of the beam 17 to normal position.

It is desirable, however, that means be provided, which, while permitting the pawl 61 to remain out of a position in which it contacts with the ratchet wheel 38 during the weighing of the object on the platform responsive to a deposited coin, will release the coin lever 58 from the locked position referred to and permit it to swing to the position shown in Fig. 4, to effect, in turn, the releasing of the pawl 61 to permit the latter to engage the ratchet teeth 38, should two persons seek to obtain their respective weights by a single coin insertion, as by one person stepping from the platform simultaneously with another person stepping upon the platform. To this end I provide mechanism which automatically operates to disengage the lever 69 from the coin lever 58 as the result of the removal of a material portion of the weight imposed on the platform, such as would result where two persons seek to obtain their respective weights as above stated, the release of the pawl 61 and its consequent engagement with the ratchet 38 preventing the rotation of the pointer 26 in a direction away from the zero mark on the scale and exerting such a degree of friction between it and the teeth of the ratchet in the rotating of the ratchet in the opposite direction as to prevent accurate weighing. The particular illustrated construction of mechanism for the purpose just stated comprises a pawl 74 of general bellcrank shape pivotally connected at 75, between its ends, to the lever 69. One arm, 76, of this pawl is provided with a lug 77, the other arm, 78, thereof which is heavier than the arm 76, having a lug 79 bearing by gravity against the upper edge of the lever 69. The lug 77 cooperates with an upwardly extending ratchet plate 80 rigidly secured to the outer end of the beam 17, as by the screws 81, the series of teeth thereon and represented at 82, inclining upwardly, slightly to the right in Fig. 4 in the normal condition of the weighing mechanism. The parts just referred to are so constructed and arranged that when the lever 58 is rocked to a position in which it disengages the pawl 61 from the ratchet 38 and becomes interlocked at its lug 68 with the shoulder 72, the lug 77 will project into engagement with the teeth 82. Thus when the beam 17, following the conditioning of the parts as just stated, rises, even a slight amount only, the engagement of the tooth 82 with the lug 77 swings the lever 69 in counter-clockwise direction in Fig. 4 withdrawing it from engagement with the lug 68, whereupon the lever 58 and pawl 61 return to released position (Fig. 4).

The pawl 74 being free to rotate in counter-clockwise direction in Fig. 4, it merely idles against the teeth 82 as the latter move downwardly across it during the lowering of the beam 17 after the coin lever 58 has been swung as a coin as above stated into interlocking engagement with the shoulder 72.

A brief description of the operation of the machine is as follows:

Assuming that an object to be weighed is imposed on the platform 13, the beam 17 is rocked downwardly against the resistance of the spring 24, a distance commensurate with the weight of the object, but the pointer 26 remains at zero because locked against rotation by the coin controlled mechanism. Upon dropping a coin into the chute 66, the lever 58 is rocked in counter-clockwise direction in Fig. 4 withdrawing the pawl 61 from engagement with the ratchet 38 whereupon the segmental rack 44 lowers into engagement at its surface 48 with the roller 49, the shaft 29 in this operation being rotated by the rack 44 in counter-clockwise direction in Fig. 4 with the result of moving the pointer 26 to a position opposite the scale indicating the weight of the object, the weight 57 augmenting the gravity of the rack 44, and ensuring the engagement of the same side surfaces of the teeth of the pinion 42 with the teeth of the gear 44 at all times thereby avoiding lost motion between these gears which if present would produce inaccurate weighing. The pointer 26 is rotated as described by the engagement of the lug 35 rigid on the shaft 29 with the lug 33 on the rotatable pointer, these lugs being yieldingly held in engagement at all times by the spring 36 which is provided to permit of oscillation of the pointer 26 relative to the shaft 29 by the inertia of the pointer 26 and the parts rigidly connected therewith, thereby relieving the pointer of the stress it would be subjected to were the construction such that the pointer is brought to a dead stop, and further causes the pointer to move, in oscillating, as in a scale of the so-called balanced type.

The coin lever 58 is held in a position in which the pawl 61 is disengaged from the ratchet 38, by the lever 69 which latter drops into interlocking engagement with the lever 58 as stated, the lever 58 and pawl 61 remaining in the position just referred to until the lever 69 is raised out of engagement with the lug 68 on the lever 58 either by the engagement of the boss 73 with the lever 69 or the engagement of the teeth 82 with the pawl 74, the various parts assuming the normal position shown in Fig. 4, by the return of the beam 17 to normal position under the action of the spring 24 after the weight is removed from the platform, it being understood that the engagement of the roller 49 with the lower edge portion of the segmental gear 44 returns this gear and the various parts controlled thereby, including the pointer 26, to normal position, it being preferred that the segmental rack 44 be provided with a boss 83 adapted to engage a stiff spring plate 84, the position of which latter is controlled by an adjusting screw 85 screwing in a boss 86 on the plate 19, to ensure the normal positioning of the parts with the pointer 26 opposite the zero mark on the dial. Inasmuch as the beam 17 responsive to weight imposed on the platform, swings from a fulcrum (18) to one side of the draft bar 14, it has been found necessary to provide the surface 48 of the segmental gear 44, of the shape shown, to permit of the use of a scale 27 having uniform graduations throughout its extent.

By preference the part of the machine which presents the curved bearing surface 48 is adjustable relative to the part supporting it for permitting of its adjustment up or down, as desired, in the initial adjustment of the parts of the scale, into the proper position for causing the pointer to accurately register the weight of objects placed on the scale throughout its range of weighing, such adjustment being provided for in the particular illustrated embodiment of my invention by providing the bearing surface 48 on a strip-like extension-portion 87 of the segment plate 44 connected therewith by a neck-portion 88, the plate 44 and portion 87 containing openings 89 and 90, respectively, to receive the pins of any suitable wrench, (not shown), for bending the portion 87 into the desired position of adjustment.

The adjustment of the roller 49, by adjusting the lever 50 through the medium of the screw 53, permits of the adjustment of the parts to position the pointer at zero in the normal position of the scale, following which adjustment the operator rotates the screw 85 to cause the plate 84 to touch the lug 83, the stop-function performed by the parts just referred to preventing the segment 44 and the parts controlled thereby from rotating backwardly upon removal from the scale of the object being weighed, to a position substantially beyond the zero mark, and thus ensures the dropping of the tooth 63 into the notch 41 of the gear 38, the above described adjustment for the roller 49 also serving as a means to position the pointer at zero in the event of such wear of the parts of the mechanism or such change in tension of the spring, as would disturb the initial adjustment of the pointer in zero-position.

Also the provision of the rocking lever 50 with its spring 52, serves as a buffer to cushion the parts in the upward movement of the parts with the beam 17 in the removal of the object from the scale, and thus avoids objectionable shock to these parts.

While I have illustrated and described a particular construction embodying my invention, I do not wish to be understood as intending to limit it thereto, as the same may be variously modified and altered without departing from the spirit of my invention.

What I claim as new, and desire to secure by Letters Patent, is:

1. In a weighing scale, the combination of a pivotal weighing beam, means yieldingly resisting the movement of said beam in one direction, means engaging said beam to one side of its pivot for actuating said beam in the opposite direction upon application of weight to the scale, weight-indicating means, and means separate from, and controlled by, said beam for controlling said weight-indicating means and comprising a cam device through the medium of which said weight-indicating means are controlled.

2. In a weighing scale, the combination of a pivoted weighing beam, means yieldingly resisting the movement of said beam in one direction, means engaging said beam to one side of its pivot for actuating said beam in the opposite direction upon application of weight to the scale, a revoluable pointer, and a pivoted rack geared to said pointer and bearing against said beam.

3. In a weighing scale, the combination of a pivoted weighing beam, means yieldingly resisting the movement of said beam in one direction, means engaging said beam to one side of its pivot for actuating said beam in the opposite direction upon application of weight to the scale, a revoluble pointer, and a pivoted rack geared to said pointer and having a cam portion at which it bears against said beam.

4. In a weighing scale, the combination of a pivoted weighing beam, means yieldingly resisting the movement of said beam in one direction, means engaging said beam to one side of its pivot for actuating said beam in the opposite direction upon application of weight to the scale, a revoluble pointer, and a pivoted rack geared to said pointer and having a curved cam portion at which it bears against said beam.

5. In a weighing scale, the combination with a rotatable shaft, means for imparting relatively rapid rotation to said shaft in the weighing operation, a pointer rotatable relative to said shaft, and means for rotating said pointer from said shaft comprising overlapping driving and driven parts on said shaft and pointer and a spring for holding said parts normally in engagement and adapting said pointer, under its inertia to overrun said shaft, against the resistance of said spring, in moving to weight indicating position.

6. In a weighing scale, the combination of a member adapted to move upon placing an object on the scale, means yieldingly resisting the movement of said member, and weight-indicating means tending to move in one direction and comprising a member having an extension supported by a neck-portion and presenting a curved surface at which it rests on said first-referred-to member.

7. In a weighing scale, the combination of a member adapted to move upon placing an object on the scale, means yieldingly resisting the movement of said member, and weight-indicating means tending to move in one direction and comprising a member having an extension supported by a neck-portion and presenting a curved surface at which it rests on said first-referred-to member, said last-named member containing apertures therein so disposed as to permit said extension to be bent into the desired position by a wrench inserted into said apertures.

8. In a weighing scale, the combination of a member adapted to move upon placing an object on the scale and having a spring-pressed bearing member, means yieldingly resisting the movement of said first-named member, and weight-indicating means tending to move in one direction and having a portion at which it rests on said bearing member.

9. In a weighing scale, the combination of a member adapted to move upon placing an object on the scale and having a spring-pressed adjustable bearing member, means yieldingly resisting the movement of said first-named member, and weight-indicating means tending to move in one direction and having a portion at which it rests on said bearing member.

10. In a weighing scale, the combination of a member adapted to move upon placing an object on the scale and having a lever pivoted thereon, means for adjusting said lever, a spring yieldingly restraining the rocking of said lever in one direction, means yieldingly resisting the movement of said member, and weight-indicating means tending to move in one direction and having a portion at which they bear against said lever.

11. In a weighing scale, the combination of a pivoted weighing beam, means yieldingly resisting the movement of said beam in one direction, means engaging said beam to one side of its pivot for actuating said beam in the opposite direction upon application of weight to the scale, weight-indicating means, means separate from, and controlled by, said beam for controlling said weight-indicating means and having a cam portion by which said last-named means are controlled by said beam, and coin-controlled means controlling the operation of said weight-indicating means.

12. In a weighing scale, the combination of a pivoted weighing beam, means yieldingly resisting the movement of said beam in one direction, means engaging said beam to one side of its pivot for actuating said beam in the opposite direction upon application of weight to the scale, a revoluble pointer, a pivoted rack geared to said pointer and bearing against said beam, and coin-controlled means controlling the operating of said pointer.

13. In a weighing scale, the combination of a pivoted weighing beam, means yieldingly resisting the movement of said beam in one direction, means engaging said beam to one side of its pivot for actuating said beam in the opposite direction upon application of weight to the scale, a revoluble pointer, a pivoted rack geared to said pointer and having a cam portion at which it bears against said beam, and coin-controlled means controlling the operation of said pointer.

14. In a weighing scale, the combination of a member adapted to move upon placing an object on the scale, means yieldingly resisting the movement of said member, and weight-indicating means tending to move in one direction and comprising a member having a portion presenting a curved surface at which it rests on said first-referred-to member, said portion being adjustable to vary the position occupied by said curved surface.

15. In a weighing scale, the combination of a member adapted to move upon placing an object on the scale, a lever pivoted on said member and having a bearing portion, means yieldingly resisting the movement of said first-named member, weight-indicating means tending to move in one direction and having a portion at which said last-named means rest on said bearing portion, said lever being adjustable about its pivot to move said bearing portion toward and away from said second-referred-to portion and means for holding said lever in adjusted position.

16. In a weighing scale, the combination of a member adapted to move upon placing an object on the scale, a lever pivoted on said member and having a bearing portion, means yieldingly resisting the movement of said first-named member, weight-indicating means tending to move in one direction and having a curved portion at which said last-named means rest on said bearing portion, said lever being adjustable about its pivot to move said bearing portion toward and away from said second-referred-to portion and means for holding said lever in adjusted position.

17. In a weighing scale, the combination with a rotatable shaft, means for imparting relatively rapid rotation to said shaft in the weighing operation, a pointer rotatable relative to said shaft, and means for operating said pointer from said shaft comprising overlapping driving and driven parts on said shaft and pointer, and a spring operatively connected with said pointer and shaft for holding said parts normally in engagement and adapting said pointer, under its inertia, to overrun said shaft against the resistance of said spring in moving to weight-indicating position.

18. In a weighing scale, the combination with a rotatable shaft, means for imparting relatively rapid rotation to said shaft in the weighing operation, a pointer rotatable relative to said shaft, and means for operating said pointer from said shaft comprising lugs on said pointer and shaft having overlapped driving engagement one with the other, and a spring for holding said lugs normally in engagement and adapting said pointer, under its inertia, to overrun said shaft against the resistance of said spring in moving to weight-indicating position.

BRUNO RADTKE.